(12) United States Patent
Otsuka et al.

(10) Patent No.: US 11,574,419 B2
(45) Date of Patent: Feb. 7, 2023

(54) STEREO CAMERA ADJUSTMENT SYSTEM

(71) Applicant: SUBARU CORPORATION, Tokyo (JP)

(72) Inventors: Shu Otsuka, Tokyo (JP); Hitoshi Nakamura, Tokyo (JP); Shinya Enomoto, Tokyo (JP); Kosuke Nakano, Tokyo (JP); Michihiro Kurosaki, Tokyo (JP); Kenji Kamegai, Tokyo (JP); Hiroyuki Matsumoto, Tokyo (JP); Yuto Nakagawa, Tokyo (JP); Taiki Amemiya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 397 days.

(21) Appl. No.: 16/707,570

(22) Filed: Dec. 9, 2019

(65) Prior Publication Data
US 2020/0258258 A1   Aug. 13, 2020

(30) Foreign Application Priority Data
Feb. 13, 2019   (JP) .............................. JP2019-023195

(51) Int. Cl.
*G06T 7/80*   (2017.01)
*B60R 1/00*   (2022.01)

(52) U.S. Cl.
CPC .................. *G06T 7/85* (2017.01); *B60R 1/00* (2013.01); *B60R 2300/105* (2013.01);
(Continued)

(58) Field of Classification Search
None
See application file for complete search history.

(56) References Cited

U.S. PATENT DOCUMENTS

2015/0279017 A1   10/2015   Tamura et al.
2016/0161602 A1*   6/2016   Prokhorov ............ G01S 7/4026
702/97
(Continued)

FOREIGN PATENT DOCUMENTS

GB         2396005 A   *   6/2004   ............ G01D 18/00
JP     2004-132870 A       4/2004
(Continued)

*Primary Examiner* — Rebecca A Volentine
(74) *Attorney, Agent, or Firm* — Troutman Pepper Hamilton Sanders LLP

(57) ABSTRACT

A stereo camera adjustment system disposes an adjustment plate that displays an adjustment chart for adjusting deviation of image information caused by position misalignment of the stereo camera at a predetermined position relative to a vehicle mounted with a stereo camera, capture an image of the adjustment chart, and process the captured image of the adjustment chart to correct the deviation of the image information. The stereo camera adjustment system includes a plate movement device that adjusts a disposed state of the adjustment plate relative to the vehicle, a detector that detects an attitude of the vehicle stopped at a defined position, and a controller that controls, based on the detected attitude of the vehicle, the plate movement device to adjust the disposed state of the adjustment plate such that the adjustment plate is at the predetermined position relative to the vehicle.

5 Claims, 3 Drawing Sheets

(52) U.S. Cl.
  CPC ... *B60R 2300/107* (2013.01); *B60R 2300/402* (2013.01); *B60R 2300/605* (2013.01)

(56) References Cited

U.S. PATENT DOCUMENTS

2016/0353083 A1\* 12/2016 Aoki .................. G06T 7/70
2019/0172225 A1\* 6/2019 Park .................. G01C 21/3602
2021/0197841 A1\* 7/2021 Barcin ................ B60W 50/045

FOREIGN PATENT DOCUMENTS

JP        2015-143657 A    8/2015
JP        2015-190921 A    11/2015

\* cited by examiner

STEREO CAMERA ADJUSTMENT SYSTEM

CROSS-REFERENCE TO RELATED APPLICATIONS

The present application claims priority from Japanese Patent Application No. 2019-023195 filed on Feb. 13, 2019, the entire contents of which are hereby incorporated by reference.

BACKGROUND

The disclosure relates to stereo camera adjustment systems and, in particular, to a stereo camera adjustment system to correct position misalignment of a stereo camera mounted on a vehicle by image processing.

In a known technique of stereo image processing, a stereo camera is used to capture an image of an identical object from different visual points, and the object is three-dimensionally recognized based on distance data (parallax) obtained from the image. A related technique regarding a vehicle has been developed and put into practice in which a stereo camera mounted on the vehicle captures an image of a view ahead of the host vehicle and uses the captured image to three-dimensionally recognize a travel environment ahead of the host vehicle so as to control a vehicle behavior with respect to a front obstacle in the travel environment ahead of the host vehicle and to control following travel behind a preceding vehicle.

Such a stereo camera generally includes a pair of cameras mechanically secured to make optical axes extend substantially parallel to each other with a predetermined base line length (optical axis interval) therebetween. At this time, when secured positions of the two cameras are misaligned, image capturing directions of the cameras are misaligned. This may hinder appropriate three-dimensional recognition of the travel environment ahead of the host vehicle, for example. In this respect, there is still room for improvement. In order to three-dimensionally recognize the travel environment ahead of the host vehicle, the optical axes of the two cameras are intended to extend straight in a travel direction of the vehicle. In known stereo matching in the stereo camera, object search lines (epipolar lines) of images captured by the two cameras are intended to coincide with each other in a pixel level. An assembly step of the stereo camera and an installation step to the vehicle are intended to satisfy these structural conditions. However, assembly errors and cumulative errors are likely to be unavoidable to some degree.

In view of this, Japanese Unexamined Patent Application Publication (JP-A) No. 2004-132870 discloses a stereo camera adjustment system including an adjustment chart that is disposed in front of a stereo camera and corrects a deviation of image information caused by position misalignment of the stereo camera. An image of the adjustment chart is captured by the stereo camera and processed so that a camera control unit mounted on a vehicle, for example, corrects the deviation of image information caused by the position misalignment of the stereo camera. JP-A No. 2015-143657 discloses specific details of an adjustment chart for use in the above-described stereo camera adjustment system.

SUMMARY

An aspect of the disclosure provides a stereo camera adjustment system. The system is configured to dispose an adjustment plate configured to displaying an adjustment chart for adjusting deviation of image information caused by position misalignment of the stereo camera, at a predetermined position relative to a vehicle mounted with a stereo camera. The system is configured to capture an image of the adjustment chart by the stereo camera. The system is configured to process the captured image of the adjustment chart to correct the deviation of the image information caused by the position misalignment of the stereo camera. The stereo camera adjustment system includes a plate movement device, a detector, and a controller. The plate movement device is configured to adjust a disposed state of the adjustment plate relative to the vehicle. The detector is configured to detect an attitude of the vehicle stopped at a defined position. The controller is configured to control, based on the attitude of the vehicle detected by the detector, the plate movement device to adjust the disposed state of the adjustment plate such that the adjustment plate is at the predetermined position relative to the vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

When a deviation of image information caused by position misalignment of a stereo camera mounted on a vehicle is corrected by image processing, for example, positions of inner side surfaces of right and left front wheels of the vehicle in the vehicle width direction are defined. In this state, an adjustment plate displaying an adjustment chart is disposed in a predetermined position ahead of the vehicle. In this state, an image of the adjustment chart is captured by the stereo camera to perform the adjustment. At this time, for example, relative to the defined inner side surfaces of the right and left front wheels of the vehicle in the vehicle width direction, the vehicle is simply positioned constantly appropriately to be opposed to the adjustment plate. However, when the vehicle itself has assembly errors and cumulative errors, it involves difficulty to orient optical axes of the stereo camera completely straight in a travel direction of the vehicle and relative to the inner side surfaces of the right and left front wheels of the vehicle in the vehicle width direction that define a position of the vehicle. That is, the assembled vehicle may have an attitude misaligned in yaw, pitch, and roll directions, for example, from a predetermined vehicle attitude defined in the above-described manner while the vehicle is stopped.

It is desirable to provide a stereo camera adjustment system that enables more appropriate correction of a deviation of image information caused by position misalignment of a stereo camera mounted on a vehicle by making optical axes of the stereo camera extend straight in a travel direction of the vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
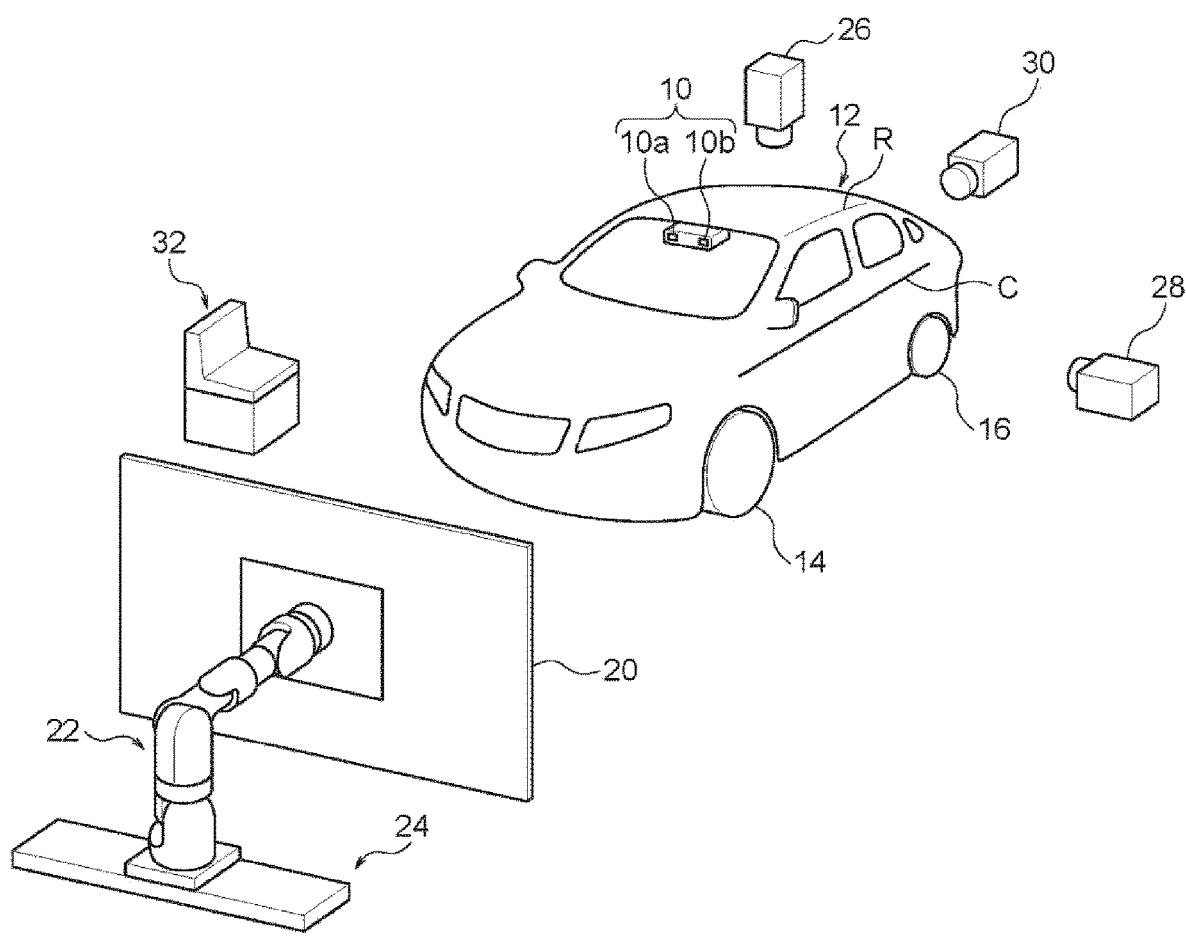
FIG. 1 is a perspective view of a stereo camera adjustment system according to an embodiment of the disclosure, illustrating a schematic configuration thereof.
Figure 2A:
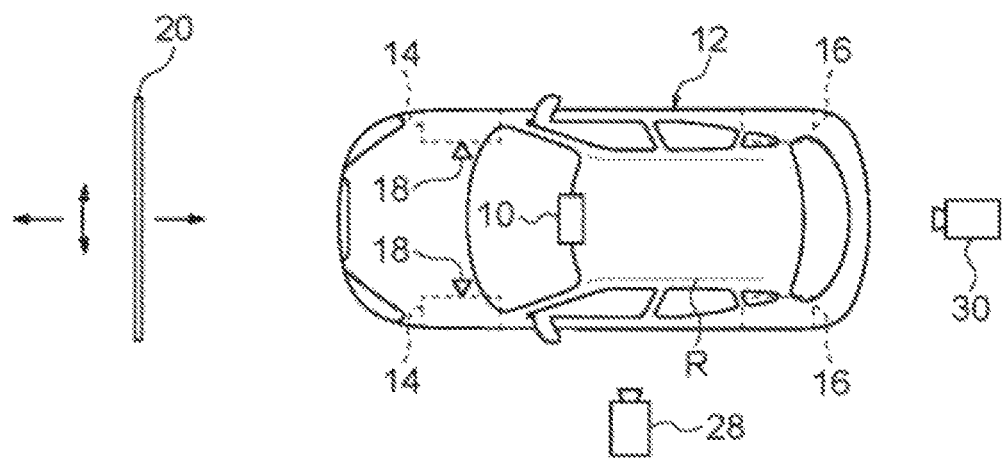
FIGS. 2A to 2C are trihedral figures of the stereo camera adjustment system in FIG. 1, illustrating a function of a plate movement device.
Figure 2B:
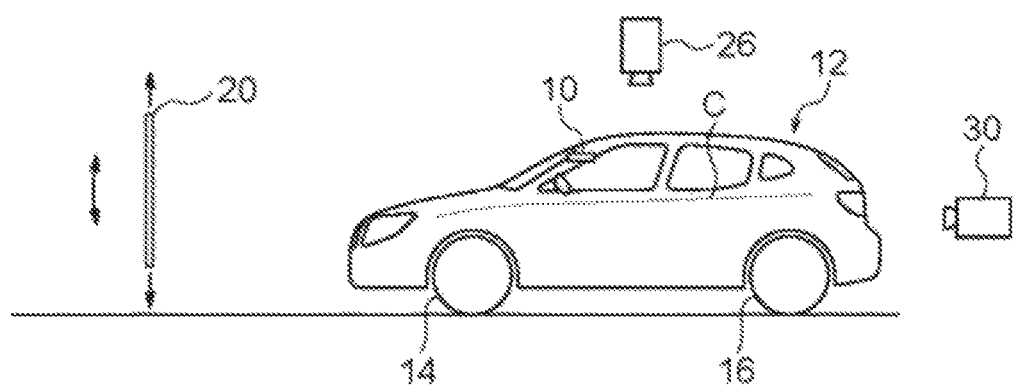
Figure 2C:
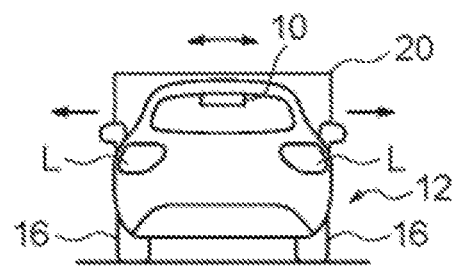

FIG. 1 is a diagram illustrating a schematic configuration of a stereo camera adjustment system according to this embodiment. FIGS. 2A to 2C are trihedral figures of FIG. 1 (from which a robot, described later, is omitted). FIG. 2A is a plan view, FIG. 2B is a side view, and FIG. 2C is a rear view. According to this embodiment, a stereo camera 10 is mounted on a vehicle 12. The stereo camera 10 includes two cameras 10a and 10b. Optical axes of the cameras 10a and 10b are at an interval of a predetermined base line length and disposed side by side in the vehicle width direction while extending in substantially the same direction as a travel direction, namely, a forward direction of the vehicle 12. However, as described above, owing to assembly errors of the stereo camera itself and cumulative errors in installation of the stereo camera to the vehicle body, for example, the optical axes of the two cameras 10a and 10b may not necessarily coincide with the forward direction of the vehicle 12. In view of this, as disclosed in JP-A No. 2004-132870, the adjustment system according to this embodiment is originally intended to cause the vehicle 12 to perform image processing to correct a deviation of image information caused by position misalignment of the optical axes of the cameras 10a and 10b.

According to this embodiment, defining members 18 (see FIG. 2A) are disposed in stereo camera adjustment areas in advance. The defining members 18 define inner side surfaces of right and left front wheels 14 of the vehicle 12 in the vehicle width direction. In the stereo camera adjustment areas, for example, while the vehicle 12 is unattended and advancing straight with the steering wheel kept in a center position and the front wheels 14 and rear wheels 16 of the vehicle 12 located at predetermined positions, the inner side surfaces of the right and left front wheels 14 in the vehicle width direction are defined by the defining members 18 to determine a position of the vehicle 12. When the vehicle 12 is stopped at such a determined position and the vehicle 12 has an attitude that coincides with a predetermined attitude, the attitude is defined as a predetermined vehicle attitude. An adjustment plate 20 is disposed ahead of the vehicle 12 having the stopped position thus determined. The adjustment chart disclosed in JP-A No. 2015-143657, for example, is displayed on a vehicle-side surface of the adjustment plate 20.

Adjustment (including correction of an image information deviation) of the stereo camera 10 performed by the vehicle 12 is disclosed in detail in, for example, JP-A No. 2004-132870 and JP-A No. 2015-190921. This adjustment of the stereo camera 10 will be described concisely. In order to calculate a distance to a target point (an object) in a captured image by triangulation, parallax (distance data) of the target point in two camera images is used. In order to obtain the parallax, epipolar lines (substantially horizontal pixel lines in this case) for searching the target point in the camera images are made coincide with each other. For example, correction of parameters implements correction of optical distortion of the two camera images, adjustment of the optical axes in the yaw direction and the pitch direction of the vehicle 12, and correction of position misalignment of the two cameras 10a and 10b, for example, correction of misalignment of the two cameras 10a and 10b in translational and rotational directions. Thus, the epipolar lines of the two cameras 10a and 10b coincide with each other. This adjustment is performed by the vehicle 12. Therefore, for example, a program for the adjustment is installed in a controller for the stereo camera 10 in advance.

Meanwhile, the vehicle 12 itself mounted with the stereo camera 10 may have assembly errors and cumulative errors. That is, even when the vehicle position is determined in the above-described manner, the adjustment plate 20 may not necessarily be correctly ahead of the vehicle 12; in other words, the stereo camera 10 may not necessarily face straight to the adjustment chart on the adjustment plate 20. In view of this, according to this embodiment, an attitude of the vehicle 12 stopped at the determined position is detected, and a position and orientation, namely, a disposed state of the adjustment plate 20 is displaced and adjusted to make the adjustment chart opposed to the front of the vehicle 12, in other words, to make the adjustment chart opposed to the travel direction of the vehicle 12. For example, the adjustment plate 20 is displaced and adjusted in such a manner that the adjustment plate 20 is disposed straight ahead of the vehicle 12 in the travel direction and at a predetermined distance from the vehicle 12. For this purpose, the adjustment plate 20 is attached to a plate movement device. For example, the adjustment plate 20 is attached to an articulated industrial robot (hereinafter simply referred to as "robot") 22. A manipulator of the robot 22 is displaced to move the adjustment plate 20. The robot 22 is mounted on a slider 24 that enables the robot 22 to move in the vehicle width direction.

The plate movement device including the robot 22 and the slider 24 enables adjustment of a position of the adjustment plate 20 ahead of the vehicle 12 in the vehicle width direction, the vertical direction, and the vehicle fore-and-aft direction and also enables adjustment of orientation of the vehicle 12 in the yaw direction, the pitch direction, and the roll direction. A plate controller 32 (which will be described later) is provided outside the vehicle 12. In response to a command from the plate controller 32, the robot 22 and the slider 24 adjust the position of the adjustment plate 20 in the vehicle width direction, the vertical direction, and the vehicle fore-and-aft direction and adjust the orientation of the vehicle 12 in the yaw direction, the pitch direction, and the roll direction along paths stored in advance.

According to this embodiment, to detect an attitude of the vehicle 12 stopped at the above-described determined position, the stereo camera adjustment system includes an upper camera 26 to capture a top-view image of the vehicle 12, a side camera 28 to capture a side-view image of the vehicle 12, and a rear camera 30 to capture a rear-view image of the vehicle 12. The rear camera 30 may be replaced with a front camera to capture a front-view image of the vehicle 12. In detecting the attitude of the vehicle (which will be described later), references for detection of the attitude of the vehicle 12 from these captured images are detected. From the top-view image of the vehicle 12, for example, a roof side rail R is detected as a yaw-direction reference for detection of an attitude of the vehicle 12 in the yaw direction. From the side-view image of the vehicle 12, for example, a character line C is detected as a pitch-direction reference for detection of an attitude of the vehicle 12 in the pitch direction. From the rear-view image of the vehicle 12, for example, a straight line connecting upper ends of rear combination lamps L (lenses) on opposite sides in the vehicle width direction is detected as a roll-direction reference for detection of an attitude of the vehicle 12 in the roll direction. When the front-view image of the vehicle 12 is captured in place of the rear-view image of the vehicle 12, for example, a straight line connecting upper ends of headlights (lenses) on opposite sides in the vehicle width direction may be detected.

The plate controller 32 includes a computer system and has an advanced arithmetic processing function. In a manner similar to an existing computer system, the plate controller 32 includes a storage and an input and output device and operates in accordance with a program stored in advance. According to this embodiment, the plate controller 32 receives the images captured by the upper camera 26, the side camera 28, and the rear camera 30 and outputs a movement command of the adjustment plate 20 to the robot 22 and the slider 24.

Figure 3:
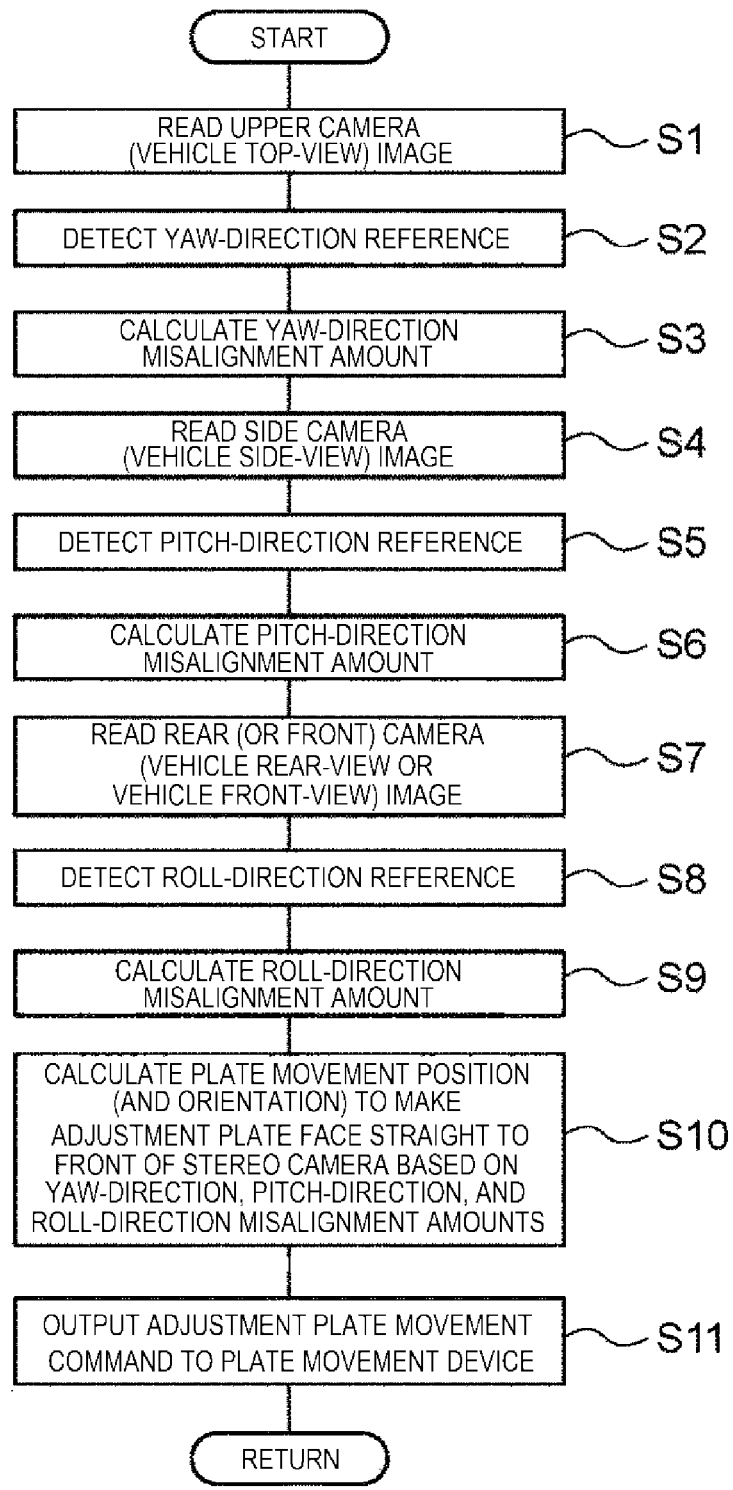
FIG. 3 is a flowchart of arithmetic processing performed by a plate controller in FIG. 1.

FIG. 3 is a flowchart of arithmetic processing performed by the plate controller 32. This arithmetic processing is started by an operator's operation. First, at step S1, the plate controller 32 reads a vehicle top-view image captured by the upper camera 26.

Next, proceeding to step S2, the plate controller 32 detects a yaw-direction reference such as a roof side rail from the vehicle top-view image read at step S1. Known template matching, for example, is applicable to this detection of the roof side rail.

Next, proceeding to step S3, the plate controller 32 calculates a yaw-direction misalignment amount of the vehicle 12 based on the yaw-direction reference detected at step S2. The plate controller 32 obtains this yaw-direction misalignment amount based on pixel values in the image, for example, by calculating in which direction and how much misalignment exists between (i) the yaw-direction reference when the vehicle 12 is in the predetermined vehicle attitude where a state of the vehicle 12 coincides with the set state as described above and (ii) the yaw-direction reference actually detected.

Next, proceeding to step S4, the plate controller 32 reads a vehicle side-view image captured by the side camera 28.

Next, proceeding to step S5, the plate controller 32 detects a pitch-direction reference such as a character line from the vehicle side-view image read at step S4. Known template matching, for example, is applicable to this detection of the character line.

Next, proceeding to step S6, the plate controller 32 calculates a pitch-direction misalignment amount of the vehicle 12 based on the pitch-direction reference detected at step S5. The plate controller 32 obtains this pitch-direction misalignment amount based on pixel values in the image, for example, by calculating in which direction and how much misalignment exists between (i) the pitch-direction reference when the vehicle 12 is in the predetermined vehicle attitude where a state of the vehicle 12 coincides with the set state as described above and (ii) the pitch-direction reference actually detected.

Next, proceeding to step S7, the plate controller 32 reads a vehicle rear-view image (or vehicle front-view image) captured by the rear (or front) camera.

Next, proceeding to step S8, the plate controller 32 detects a roll-direction reference such as a straight line connecting upper ends of rear combination lamps (or headlights) from the vehicle rear-view (or front-view) image read at step S7. Known template matching, for example, is applicable to this detection of the rear combination lamps (or headlights).

Next, proceeding to step S9, the plate controller 32 calculates a roll-direction misalignment amount of the vehicle 12 based on the roll-direction reference detected at step S8. The plate controller 32 obtains this roll-direction misalignment amount based on pixel values in the image, for example, by calculating in which direction and how much misalignment exists between (i) the roll-direction reference when the vehicle 12 is in the predetermined vehicle attitude where a state of the vehicle 12 coincides with the set state as described above and (ii) the roll-direction reference actually detected.

Next, proceeding to step S10, the plate controller 32 calculates, based on the yaw-direction, pitch-direction, and roll-direction misalignment amounts, a plate movement position and orientation to make the adjustment plate 20 face straight to the front of the stereo camera 10, that is, opposed to the travel direction of the vehicle 12. In other words, the plate movement position and orientation is a correction amount to cause the adjustment plate 20 to correct the attitude misalignment of the vehicle 12 in the yaw direction, the pitch direction, and the roll direction such that the adjustment chart is opposed to the travel direction of the vehicle 12.

Next, proceeding to step S11, the plate controller 32 outputs an adjustment plate movement command to the robot 22 and the slider 24 (that is, the plate movement device) and returns. For example, the robot 22 and the slider 24 move the adjustment plate 20 such that reference points of the adjustment chart are located in positions where the reference points of the adjustment chart face straight to the stereo camera 10, and turn the adjustment plate 20 by the yaw-direction misalignment amount (a yaw angle change amount), the pitch-direction misalignment amount (a pitch angle change amount), and the roll-direction misalignment amount (a roll angle change amount).

According to this arithmetic processing, the yaw-direction reference, the pitch-direction reference, and the roll-direction reference are respectively detected from the top-view image, the side-view image, and the rear-view image of the vehicle 12 captured by the upper camera 26, the side camera 28, and the rear camera 30. The yaw-direction, pitch-direction, and roll-direction misalignment amounts are calculated based on the references in the predetermined vehicle attitude and corrected to move the adjustment plate 20 to the predetermined position straight ahead of the vehicle 12 in the travel direction. Consequently, from this state, the adjustment program in the vehicle 12 is started up to implement image processing to appropriately correct the deviation of the image information caused by the position misalignment of the stereo camera 10.

As described above, when (i) the adjustment plate 20 is disposed at the predetermined position relative to the vehicle 12 mounted with the stereo camera 10, (ii) an image of the adjustment chart displayed on the adjustment plate 20 is captured by the stereo camera 10, and (iii) the captured image of the adjustment chart is processed to correct a deviation of image information caused by position misalignment of the stereo camera 10, the stereo camera adjustment system according to this embodiment allows a disposed state of the adjustment plate 20 relative to the vehicle 12 to be adjustable, detects the attitude of the vehicle 12, and control, based on the detected attitude of the vehicle 12, the plate movement device to adjust the disposed state of the adjustment plate 20 such that the adjustment plate 20 is located at the predetermined position relative to the vehicle 12. Thus, it is possible to correct the misalignment amounts of the vehicle 12 from the predetermined vehicle attitude in the yaw direction, the pitch direction, and the roll direction that are caused by assembly errors and cumulative errors such that the adjusted position of the adjustment plate 20 is controlled to be at the predetermined position relative to the vehicle 12. As a result, the optical axes of the stereo camera 10 can be oriented straight in the travel direction of the vehicle 12, thereby correcting the deviation of image information caused by the position misalignment of the stereo camera 10 more appropriately.

The misalignment amounts of the vehicle 12 from the preset vehicle attitude in the yaw direction, the pitch direction, and the roll direction are detected to quantitatively detect a state of the vehicle attitude caused by assembly errors and cumulative errors. The adjusted disposed state of the adjustment plate 20 is controlled to correct the detected misalignment amounts of the vehicle attitude from the predetermined attitude such that the optical axes of the stereo camera 10 can be oriented straight in the travel direction of the vehicle 12.

Based on the misalignment amounts of the vehicle 12 in the yaw direction, the pitch direction, and the roll direction, the adjusted disposed state of the adjustment plate 20 is controlled such that the adjustment plate 20 is located at the position ahead of the vehicle 12 and at the predetermined distance from the vehicle 12. As a result, the optical axes of the stereo camera 10 can be oriented straight in the travel direction of the vehicle 12.

Based on the misalignment amounts of the vehicle 12 in the yaw direction, the pitch direction, and the roll direction, adjustment is performed for orientation of the adjustment plate 20 relative to the vehicle 12 by the plate movement device. Consequently, adjustment of the orientation of the adjustment plate 20 is controlled to correct the detected misalignment amounts of the vehicle attitude from the predetermined attitude such that the optical axes of the stereo camera 10 can be oriented straight in the travel direction of the vehicle 12.

The top-view image, the side-view image, and the rear-view image of the vehicle 12 are captured by the cameras. Based on the yaw-direction reference detected from the top-view image of the vehicle 12, the pitch-direction reference detected from the side-view image, and the roll-direction reference detected from the rear-view image, the misalignment amounts of the vehicle 12 in the yaw direction, the pitch direction, and the roll direction are calculated. This makes it possible to detect the misalignment amounts of the vehicle 12 from the predetermined vehicle attitude in the yaw direction, the pitch direction, and the roll direction.

The stereo camera adjustment system according to the embodiment has been described so far. It is noted that the disclosure is not limited to the configuration described in the above embodiment, but various modifications may be made without departing from the scope of the disclosure. For example, in the embodiment, the orientation of the adjustment plate 20 is adjustable relative to the vehicle 12. When the orientation in the yaw direction, the pitch direction, and the roll direction with respect to the vehicle 12 has minute misalignment amounts, the orientation adjustment of the adjustment plate 20 may be omitted.

Similarly, when any of the misalignment amounts of the vehicle 12 in the yaw direction, the pitch direction, and the roll direction from the predetermined vehicle attitude is so small that the adjustment is not to be performed, correction of the misalignment amount in the direction in question may be omitted.

The plate movement device is not limited to the robot 22, but a known three-axis stage (table), for example, may be employed. According to the above-described embodiment, the plate movement device is disposed in the stereo camera adjustment area, for example, on the floor of an inspection site. Alternatively, the plate movement device may be disposed on a place other than the floor. For example, the plate movement device may be disposed on the ceiling of the inspection site, and the adjustment plate may be lowered from above and disposed ahead of the vehicle that has been transferred to the inspection site. After adjustment of the stereo camera, the adjustment plate may be raised to allow the vehicle to travel below the raised adjustment plate. Moreover, pillars may be disposed on opposite sides of the adjustment plate and guide vertical movements of the adjustment plate. A mechanism to change an angle of the adjustment plate may be disposed on the pillars and a support for the adjustment plate, and the angle change mechanism may be made to serve as the plate movement device. With this configuration as well, the vehicle may travel below the adjustment plate after adjusting the stereo camera. The adjustment plate may hang.

As has been described heretofore, according to the embodiment of the disclosure, the misalignment amounts of the vehicle from the predetermined attitude that are caused by assembly errors and cumulative errors are detected and corrected to perform such control that the adjustment plate is adjusted and disposed to occupy the predetermined position relative to the vehicle. Thus, the optical axes of the stereo camera can be oriented straight in the travel direction of the vehicle. As a result, the deviation of image information caused by the position misalignment of the stereo camera can be corrected more appropriately to enable accurate three-dimensional recognition of the travel environment ahead of the host vehicle.

The invention claimed is:

1. A stereo camera adjustment system configured to
   dispose an adjustment plate at a predetermined position relative to a vehicle mounted with a stereo camera, the adjustment plate being configured to display an adjustment chart for adjusting deviation of image information caused by position misalignment of the stereo camera,
   capture an image of the adjustment chart by the stereo camera, and
   process the captured image of the adjustment chart to correct the deviation of the image information caused by the position misalignment of the stereo camera in a yaw direction, a pitch direction, and a roll direction, the stereo camera adjustment system comprising:
   a plate movement device configured to adjust a disposed state of the adjustment plate relative to the vehicle;
   a detector configured to detect an attitude of the vehicle stopped at a defined position, wherein the detector is configured to detect an attitude of the vehicle to obtain a misalignment amount of the vehicle from a preset vehicle attitude in the yaw direction, the pitch direction, and the roll direction, wherein the detector comprises an image capturer configured to obtain at least one of (i) a top-view image, (ii) a side-view image, or (iii) a rear-view or front-view image of the vehicle; and
   a controller configured to control, based on the attitude of the vehicle detected by the detector, the plate movement device to adjust the disposed state of the adjustment plate such that the adjustment plate is at the predetermined position relative to the vehicle, wherein the controller is configured to calculate the misalignment amount of the vehicle in the yaw direction, the pitch direction, and the roll direction based on a yaw-direction reference detected from the top-view image of the vehicle, a pitch-direction reference detected from the side-view image, and a roll-direction reference detected from the rear-view or front-view image.

2. The stereo camera adjustment system according to claim 1, wherein
the controller is configured to control, based on the misalignment amount of the vehicle in the yaw direction, the pitch direction, and the roll direction, the plate movement device to adjust the disposed state of the adjustment plate such that the adjustment plate is disposed ahead of the vehicle and at a predetermined distance from the vehicle.

3. The stereo camera adjustment system according to claim 2, wherein
the plate movement device is configured to adjust orientation of the adjustment plate with respect to the vehicle, and
wherein the controller is configured to control, based on the misalignment amount of the vehicle in the yaw direction, the pitch direction, and the roll direction, the plate movement device to adjust the orientation of the adjustment plate with respect to the vehicle.

4. The stereo camera adjustment system according to claim 1, wherein
the plate movement device is configured to adjust orientation of the adjustment plate with respect to the vehicle, and
wherein the controller is configured to control, based on the misalignment amount of the vehicle in the yaw direction, the pitch direction, and the roll direction, the plate movement device to adjust the orientation of the adjustment plate with respect to the vehicle.

5. The stereo camera adjustment system according to claim 1, wherein the controller is configured to detect a roof side rail of the vehicle in the top-view image as the yaw-direction reference, detect a character line of the vehicle in the side-view image as the pitch-direction reference, and detect a straight line connecting upper ends of lenses of the vehicle in the rear-view image or the front-view image as the roll-direction reference, the lenses are rear combination lamps on opposite sides in a width direction of the vehicle or headlights on opposite sides in the width direction of the vehicle.

* * * * *